Figure 1:
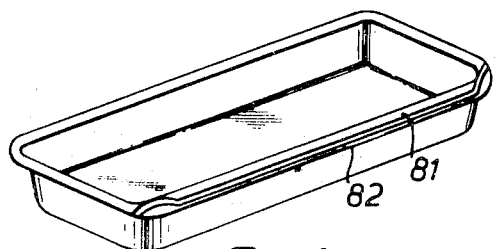

United States Patent [19]
Eisler

[11] 3,829,654
[45] Aug. 13, 1974

[54] ELECTRICALLY HEATED PACKAGE

[76] Inventor: Paul Eisler, 57 Exeter Rd., London N.W. 2 1YB, England

[22] Filed: May 23, 1973

[21] Appl. No.: 363,263

Related U.S. Application Data

[60] Division of Ser. No. 122,495, March 9, 1971, which is a continuation of Ser. No. 607,601, Dec. 30, 1966, Pat. No. 3,751,629, which is a continuation-in-part of Ser. No. 301,488, Aug. 12, 1963, Pat. No. 3,296,415, which is a continuation-in-part of Ser. No. 749,554, July 18, 1958, Pat. No. 3,100,711.

[52] U.S. Cl. ............... 219/386, 219/438, 219/521, 426/107
[51] Int. Cl. .................. F27d 11/02, H05b 3/34
[58] Field of Search .......... 219/201, 385, 386, 438, 219/521, 523; 426/107

[56] References Cited
UNITED STATES PATENTS

| | | | |
|---|---|---|---|
| 2,879,367 | 3/1959 | McLean | 219/385 |
| 3,100,711 | 8/1963 | Eisler | 426/107 |
| 3,210,199 | 10/1965 | Schlaf | 426/107 |
| 3,296,415 | 1/1967 | Eisler | 219/385 |
| 3,483,358 | 12/1969 | Eisler | 219/385 |
| 3,539,772 | 11/1970 | Eisler | 219/386 |
| 3,573,430 | 4/1971 | Eisler | 219/385 |
| 3,751,629 | 8/1973 | Eisler | 219/201 |

*Primary Examiner*—Volodymyr Y. Mayewsky
*Attorney, Agent, or Firm*—Laurence R. Brown

[57] ABSTRACT

A dispensible container constructed for a single use incorporates a thin low voltage heating film with terminals accessible from outside and opening means permitting access to its contents is used as a package for a substance adapted to be heated and plastic in the sense of being sufficiently mobile to be removed from the container as soon as it has been sufficiently heated. The outer portion of the package may comprise means for directing most of the heat inside the package to heat the substance and its side walls may be stiffened by a stiff frame of light weight material of the stressed skin type.

9 Claims, 55 Drawing Figures

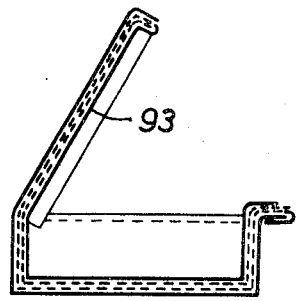
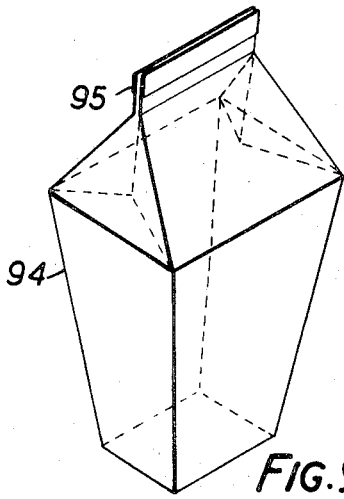
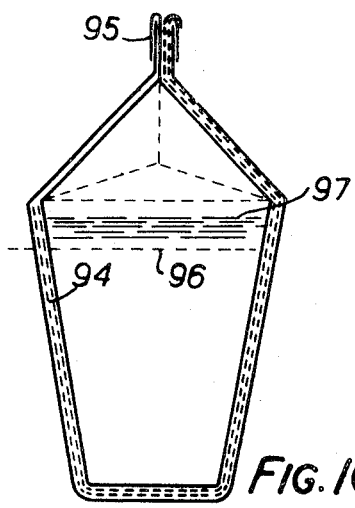
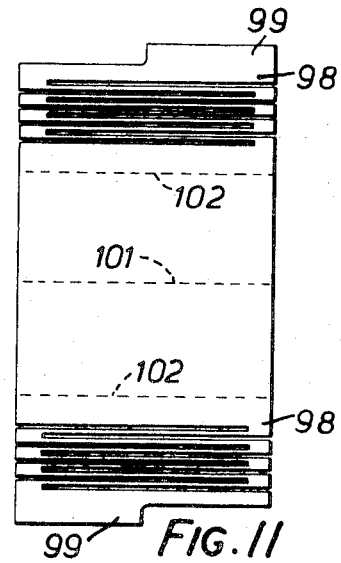
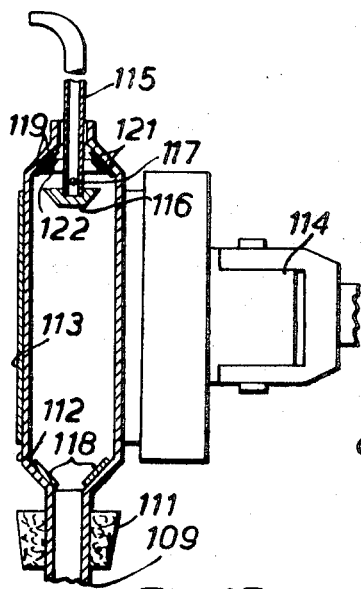

ELECTRICALLY HEATED PACKAGE

This application is a division of my application Ser. No. 122,495 filed Mar. 9, 1971 which was a continuation of my application Ser. No. 607,601 filed Dec. 30, 1966 (now U.S. Pat. No. 3,751,629) itself a continuation in part of my application Ser. No. 301,488 filed Aug. 12, 1963 for Surface Heating Device (now matured into U.S. Pat. No. 3,296,415) which was itself a continuation in part of my application Ser. No. 749,554 filed July 18, 1958 for Surface Heating Device (now matured into U.S. Pat. No. 3,100,711).

The invention relates to the heating of substances contained in packages of relatively small size. Foodstuffs in single or multi-portions for immediate consumption are a convenient example illustrative both of the order of size and the kind of substance but the invention is not restricted to this example and can be applied to many other substances which it may be desirable or necessary to heat in the package, as for example, adhesives, coating materials, synthetic resins and similar thermosetting or thermoplastic materials, greases and chemicals. Hereinafter foodstuffs will usually be referred to for convenience.

The present invention provides for a substance to be heated while contained in a dispensible container included in a package to which end a thin low voltage heating film is incorporated in the package at least during the heating operation, this film having a surface pattern presenting a resistive electrical path between at least two terminals to which access can be obtained for connection to a supply without removing the substance from the container. Thus by making connection of the terminals to a supply having a voltage appropriate to the resistance of the path heat can be generated in the film by which the substance can be heated. One object of the present invention is to enable such an arrangement to be used to heat the substance rapidly without any risk of hot spots in the conductive pattern which might damage the material, damage the pattern or have other undesirable results.

Another object is to include means in the heat path between the film and the substance whereby the surface temperature at any point on the substance is prevented from rising above a predetermined maximum valve, e.g., a value at which it is damaged or develops some undesirable characteristic such as stickiness. Thus at least during part of the heating period the film may be spaced from the surface of the substance to be heated thereby, and a small body of liquid may be present in the space which has access to the substantial area of the substance so that the temperature of the substance is kept down to boiling point of the liquid. This provision for the presence of liquid between the heating film and the substance is well adapted for use with deep frozen substances. The deep frozen substances may be enclosed within the container at least by a wrapper of metallic foil having perforations distributed thereover, a further substance which boils when heat is supplied also being included in the package and having access to the perforated foil. Such a package may be supplied separately from a heating film so that the two can be put together for use, or the package be heated by some conventional heater such as a gas or electric cooker.

Still another object of the invention is to enable the heat supplied by the film to be supplemented by conducted heat from another source, to which end a heat conductive flexible wall with one surface in contact with the substance, may have in contact with its other surface over a substantial area a plate equipped with means for supplying heat to it under the control of a temperature sensing element within the plate whereby the temperature of the plate is maintained within known limits, so enabling heat to be supplied to the substance at a rapid rate without the risk of local hot spots or temperature rises.

Further objects and features of the invention will become apparent from the following description with reference to the accompanying drawings. The drawings are diagrammatic and in particular where the heating film or other material is shown in section in most cases thicknesses are much exaggerated.

Figure 2:
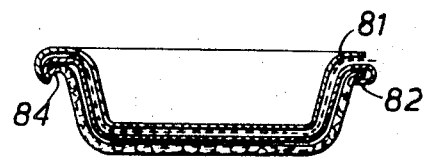
Figure 3:
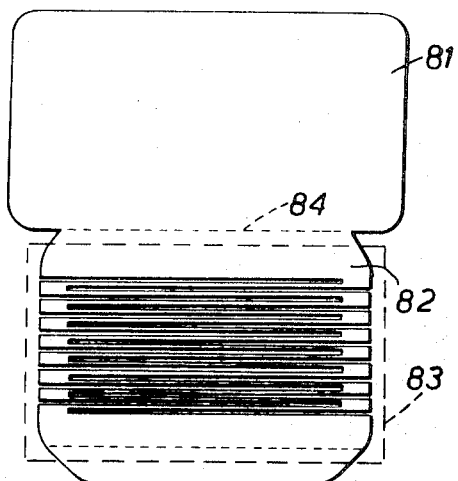
Figure 4:
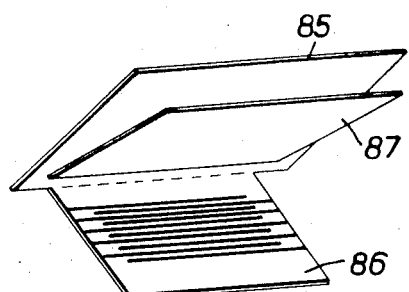
Figure 5:
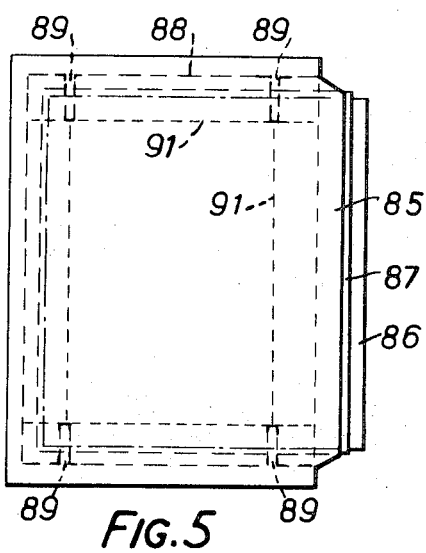
Figure 6:
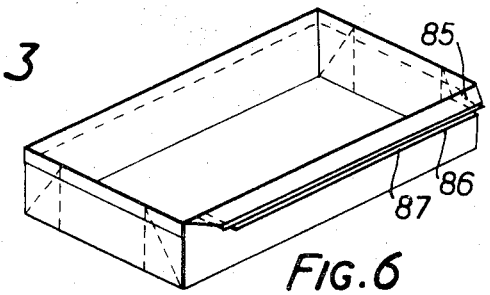
Figure 7:
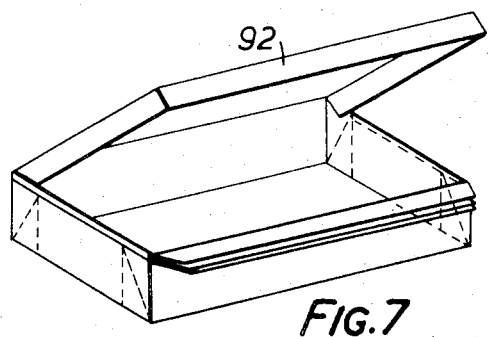
Figure 14:
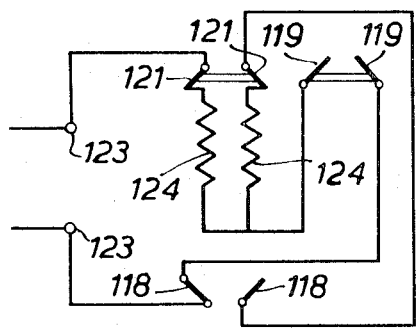
Figure 15:
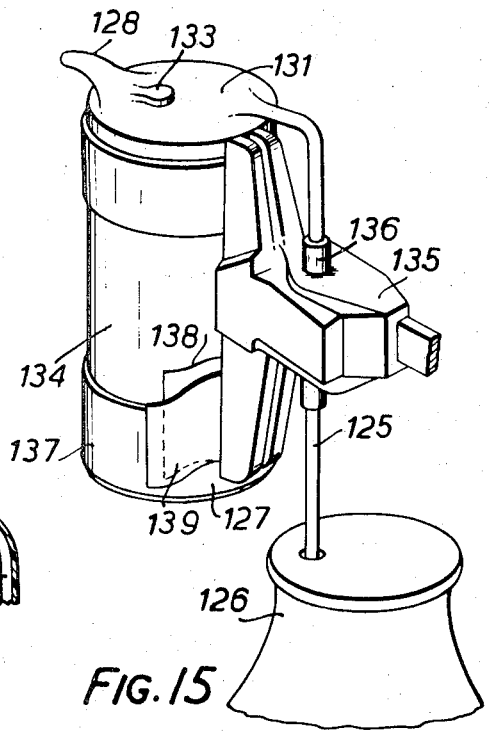
Figure 16:
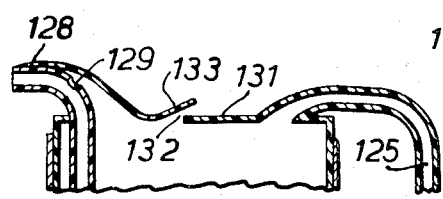
Figure 17:
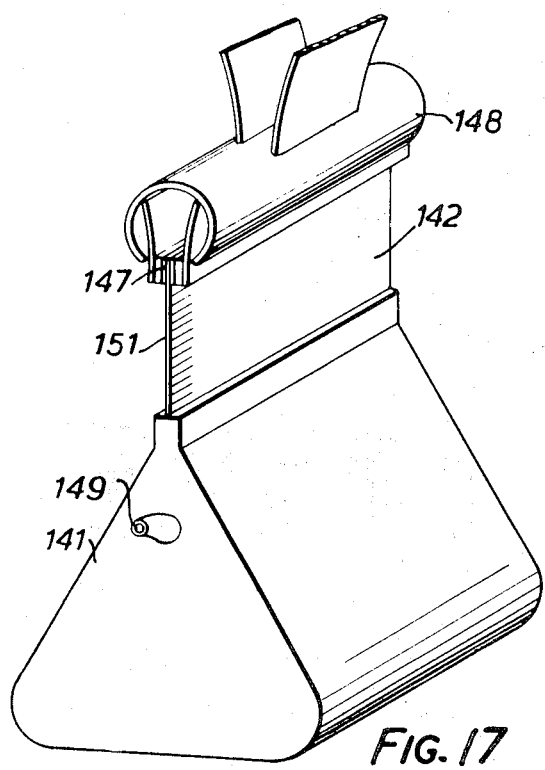
Figure 19:
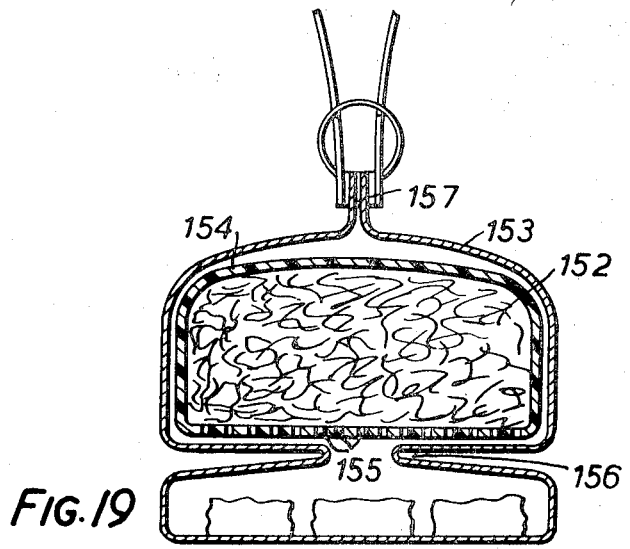
Figure 20:
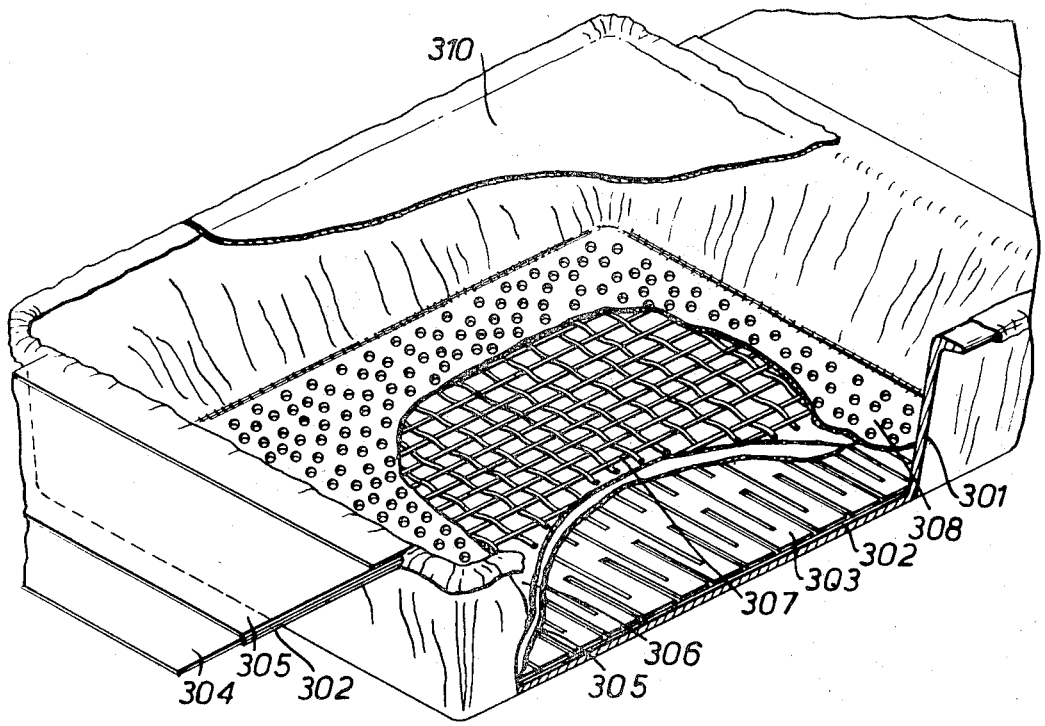
Figure 21:
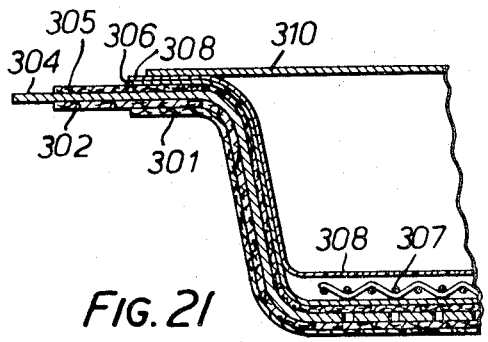
Figure 22:
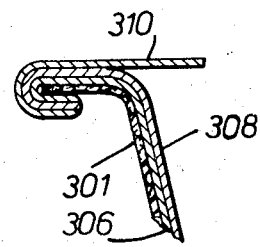
Figure 23:
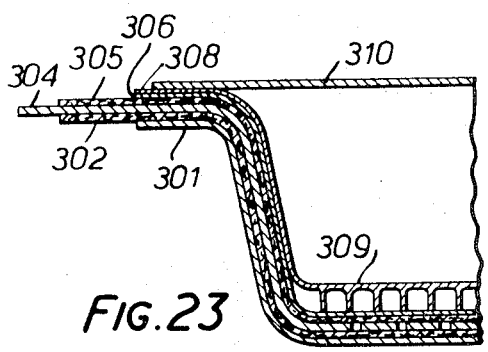
Figure 24:
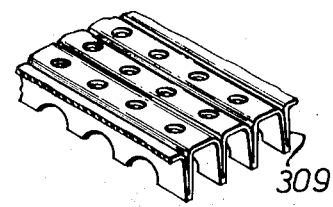
Figure 25:
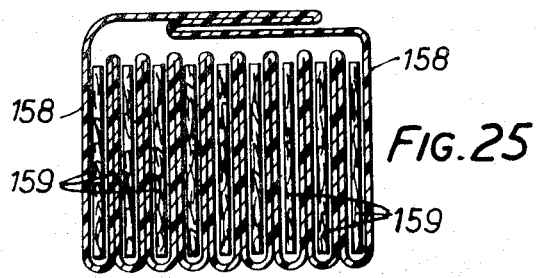
Figure 26:
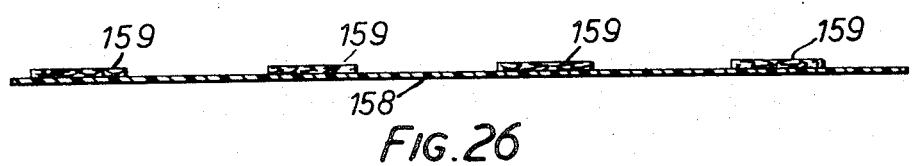
Figure 27:
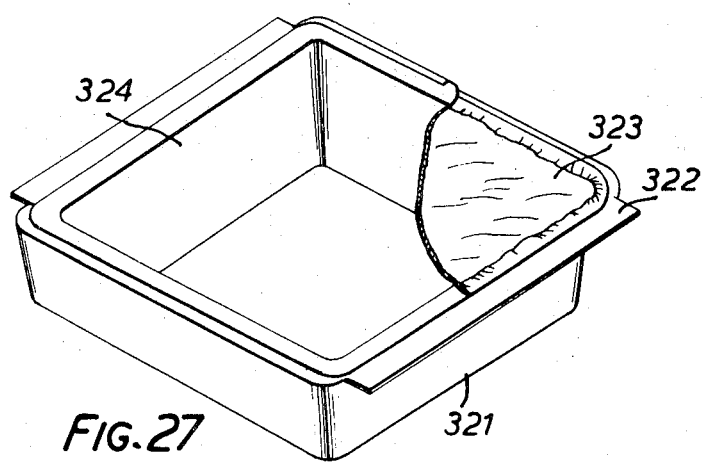
Figure 28:
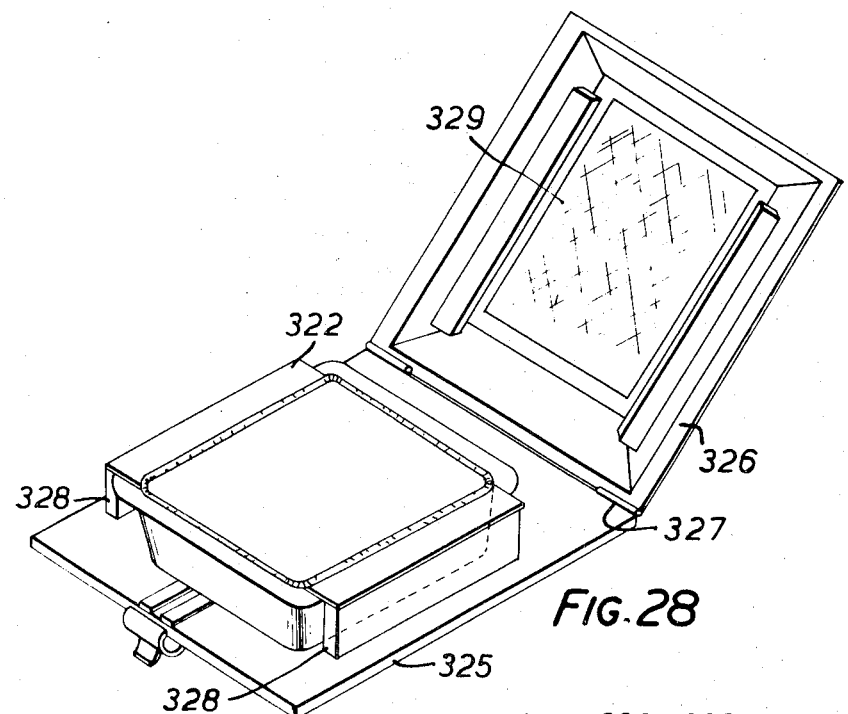
Figure 30:
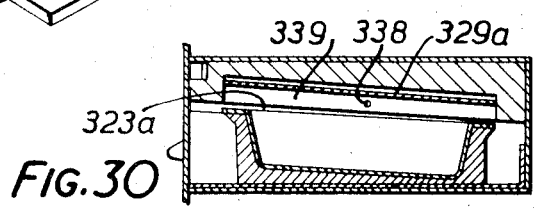
Figure 29:
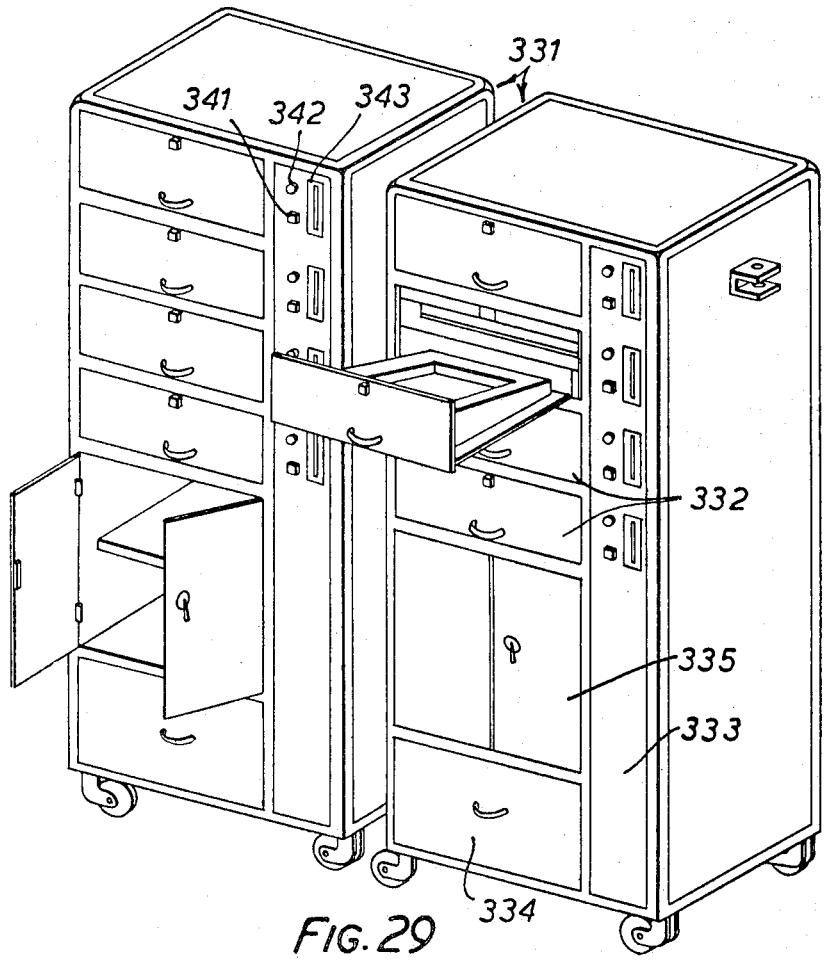
Figure 37:
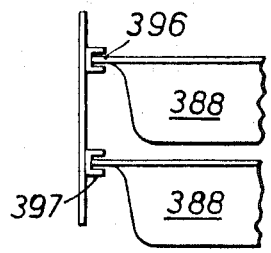
Figure 38:
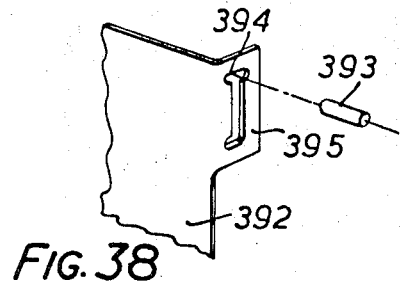
Figures 31, 35:
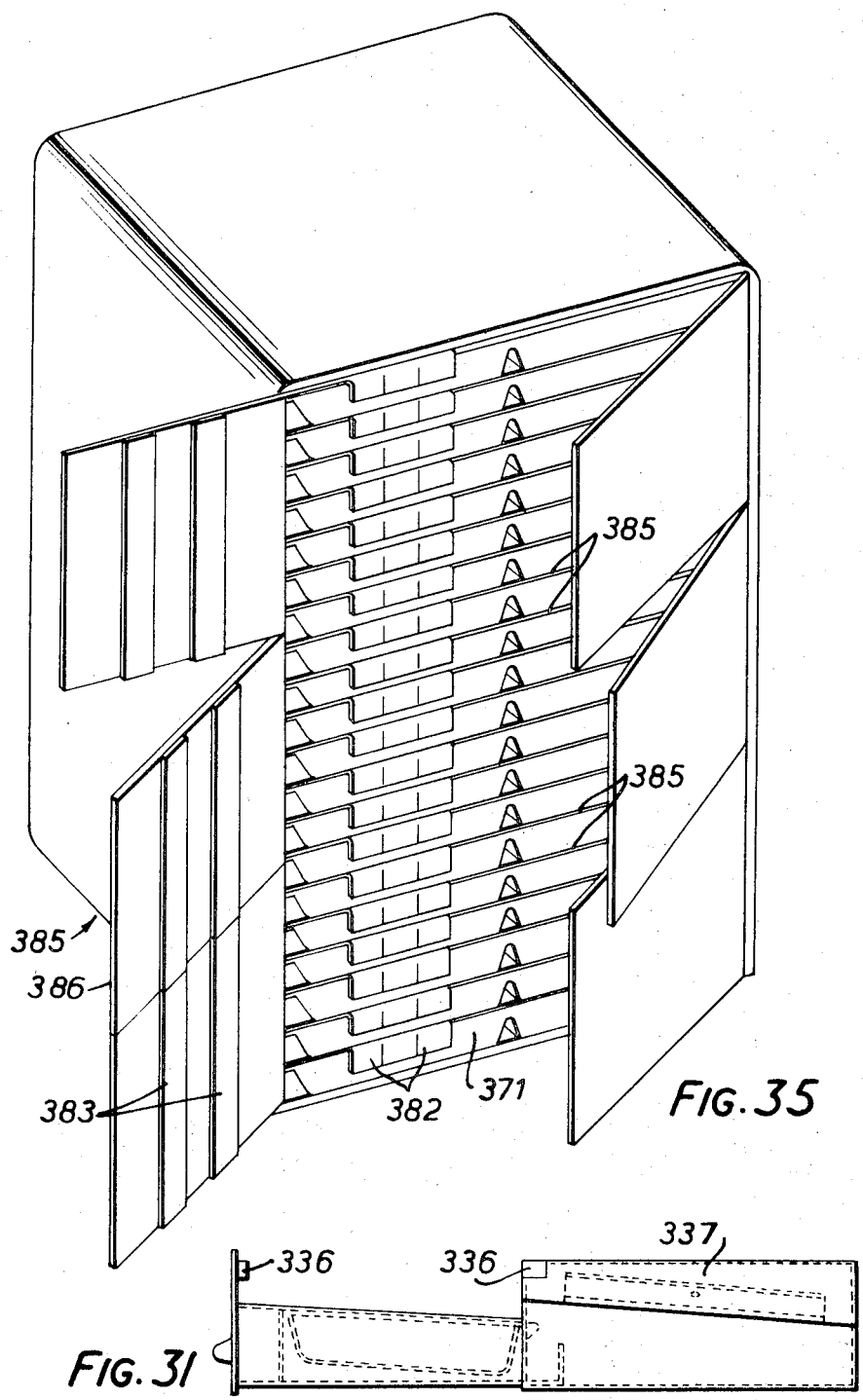
Figure 32:
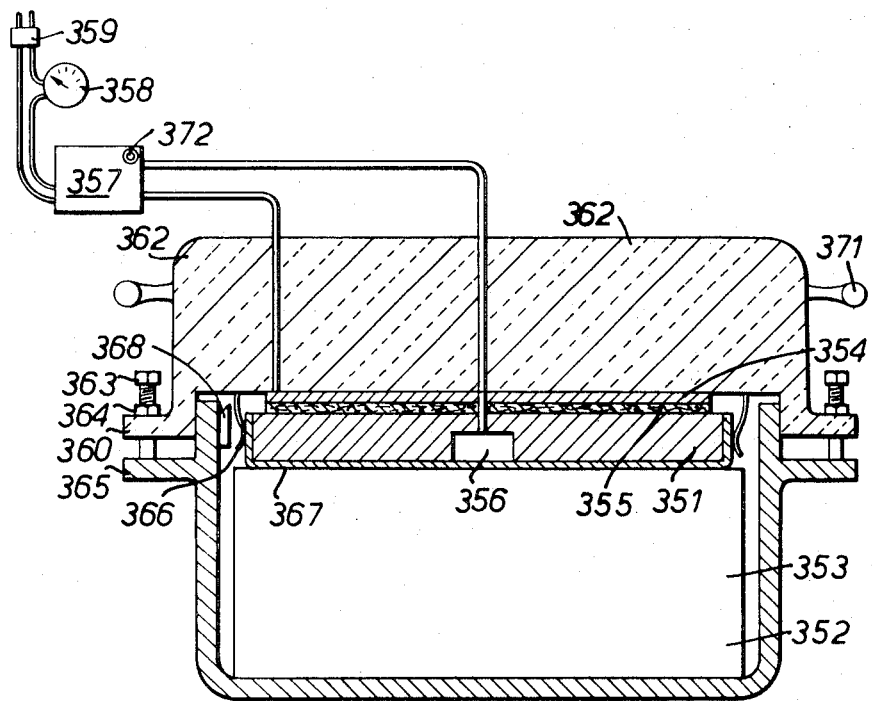

FIG. 1 is a perspective view and
FIG. 2 a cross section of a moulded trough-like dispensible container according to the invention.
FIG. 3 illustrates the heating film used in FIGS. 1 and 2.
FIG. 4 illustrates the production of a heating film for a folded container.
FIG. 5 is a plan of the blank form which such a container can be made.
FIG. 6 is a perspective view of the folded container.
FIG. 7 is a perspective view and
FIG. 8 a cross section of another folded container.
FIG. 9 is a perspective view and
FIG. 10 a section of yet another folded container.
FIGS. 11 and 12 illustrate the production of a heating film with two branches.
FIG. 13 is a vertical section of a dispensible container for heating and dispensing a batch of liquids.
FIG. 14 is a circuit diagram of the container of FIG. 13.
FIG. 15 is a perspective view and
FIG. 16 is a detail section of another dispensible container for heating and dispensing a batch of liquids.
FIG. 17 is a perspective view and
FIG. 18 a section of a dispensible container in which the heating film also indicates the quantity of substance removed.
FIG. 19 is a section of an embodiment which provides for movement of the heating film in relation to the contents of the container.
FIG. 20 is a perspective view, partly in section of a further development for steaming or similar heating a substance.
FIGS. 21 and 22 are detail sections of FIG. 20.
FIG. 23 is a detail similar to FIG. 21 of an alternative to FIGS. 20 to 22.
FIG. 24 is another detail of this alternative.
FIGS. 25 and 26 show two stages in the use of a dispensible container in which the configuration of the heating film is changed between stages.
FIG. 27 is a section of another container the contents of which are to be heated by a contact heater.
FIG. 28 is a detail of a modification of FIG. 27.
FIG. 29 shows a form of heating film which can be used in the invention.
FIG. 30 is a sectional plan and FIG. 31 is a sectional elevation of a form of package within the scope of the invention.
FIG. 32 is a cross section of a heating film which can be used in the invention, embodying a carbon film.

Figure 33:
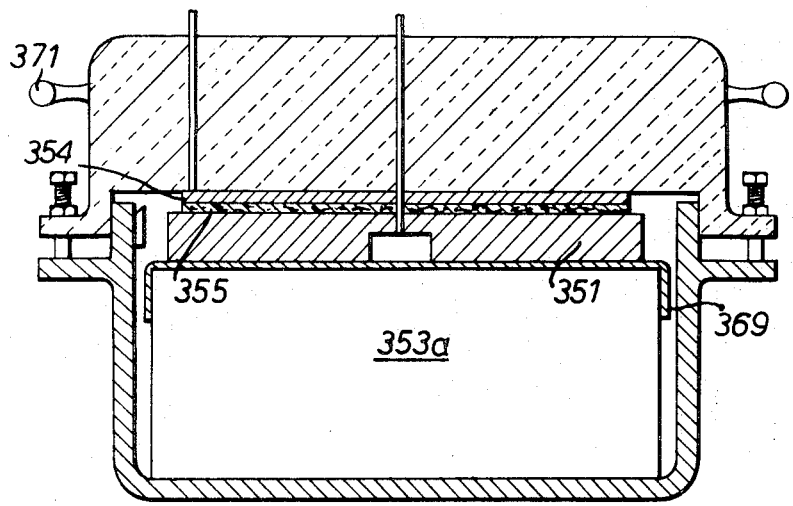

FIG. 33 is a plan of the electrodes and

Figure 34:
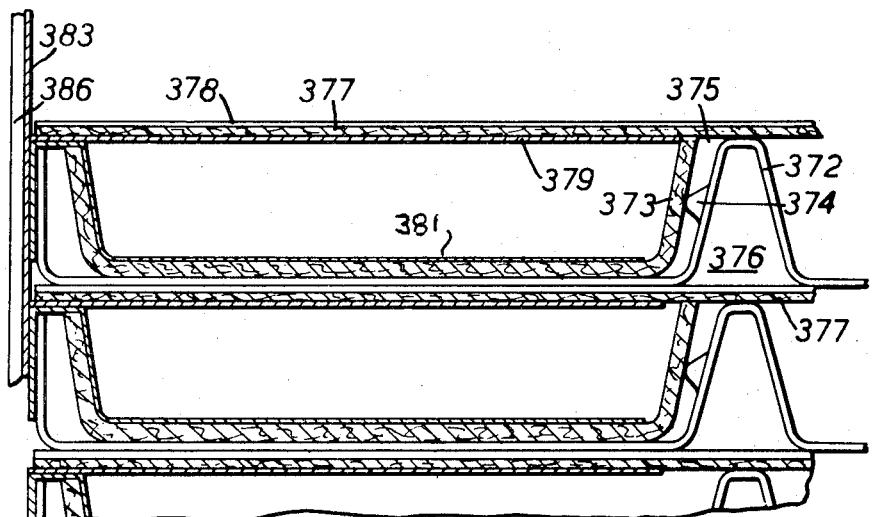
Figure 36:
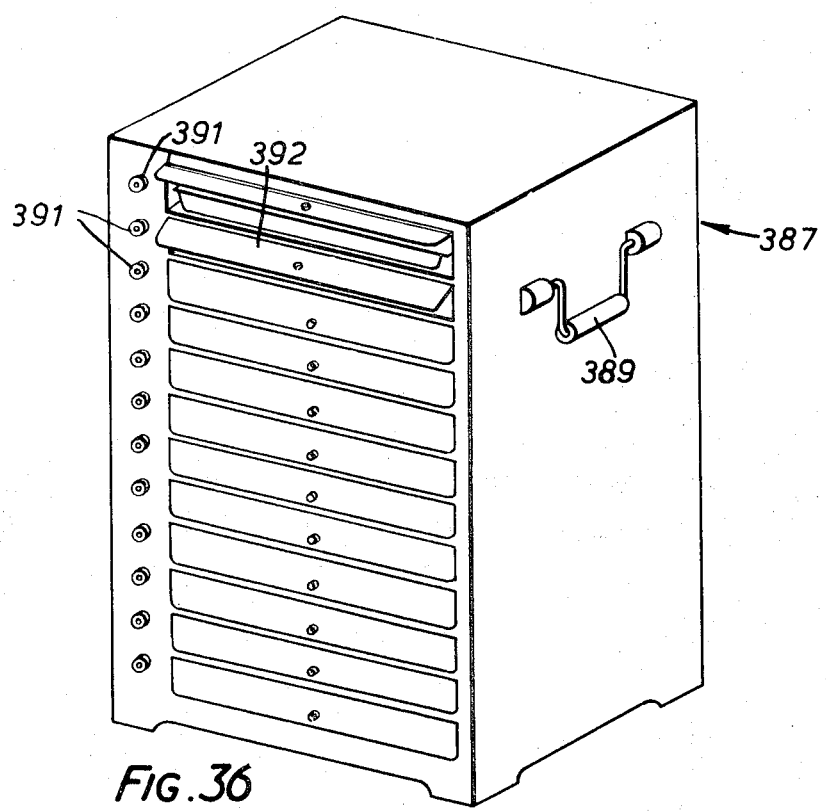
Figure 39:
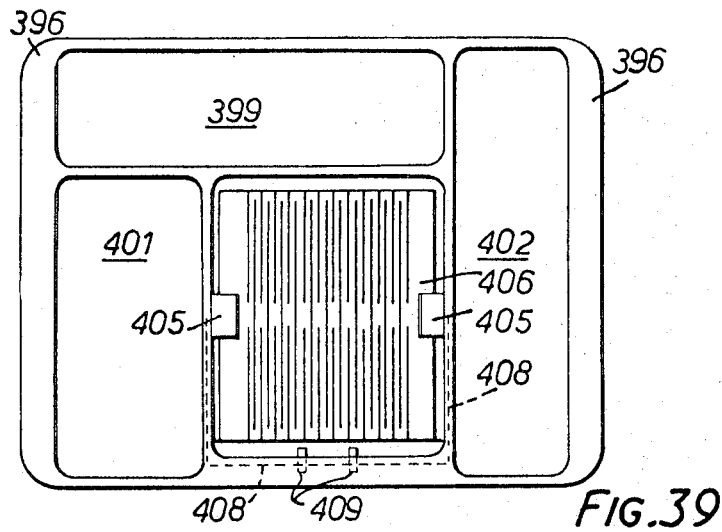
Figure 40:
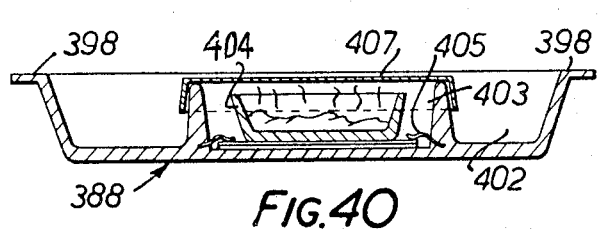
Figure 41:
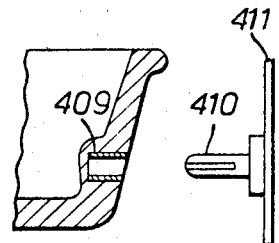
Figure 42:
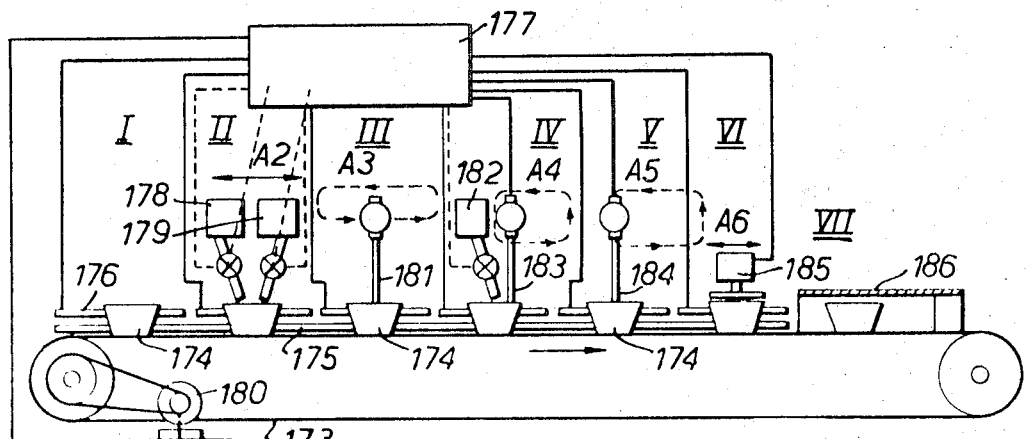
Figure 43:
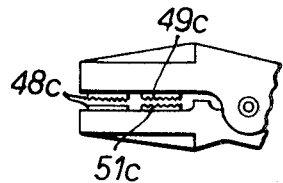
Figure 45:
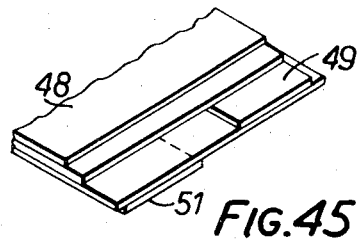
Figure 44:
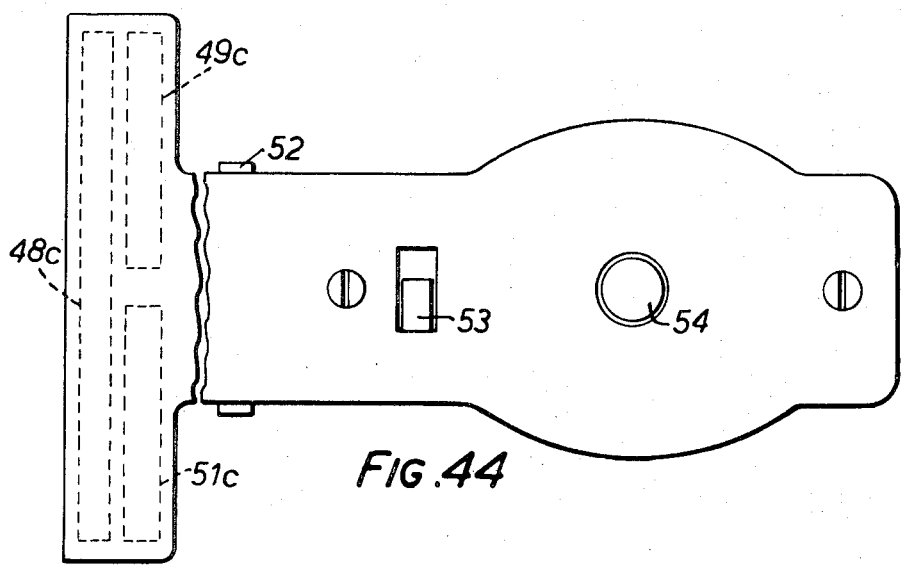
Figure 46:
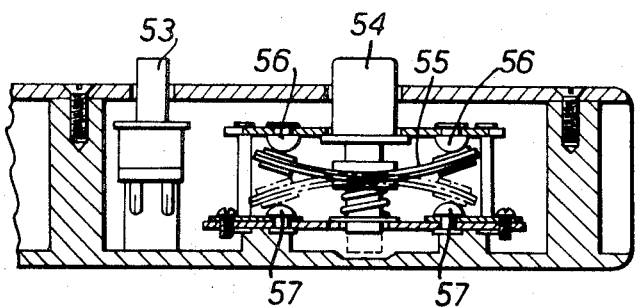
Figure 47:
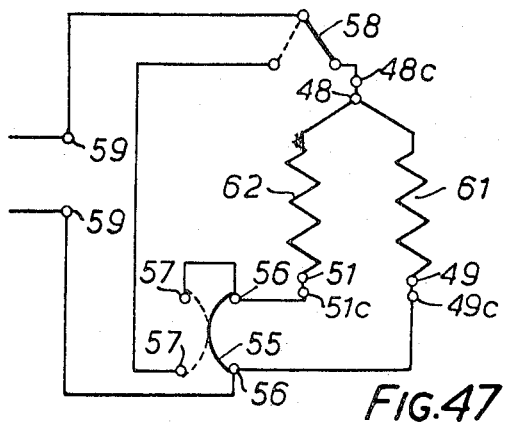
Figures 48, 49:
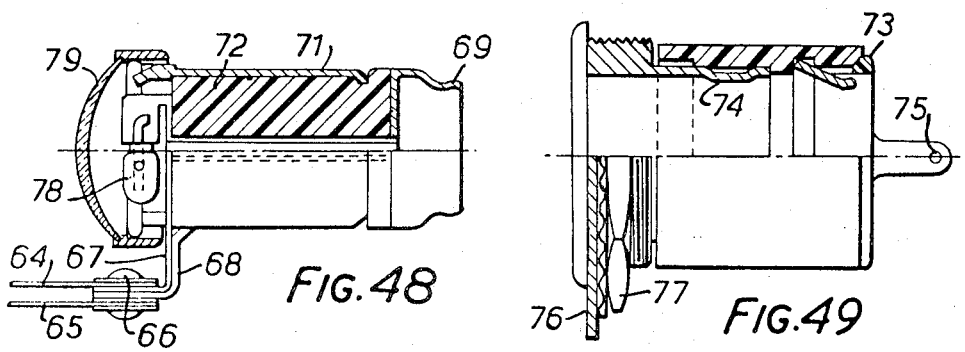
Figure 50:
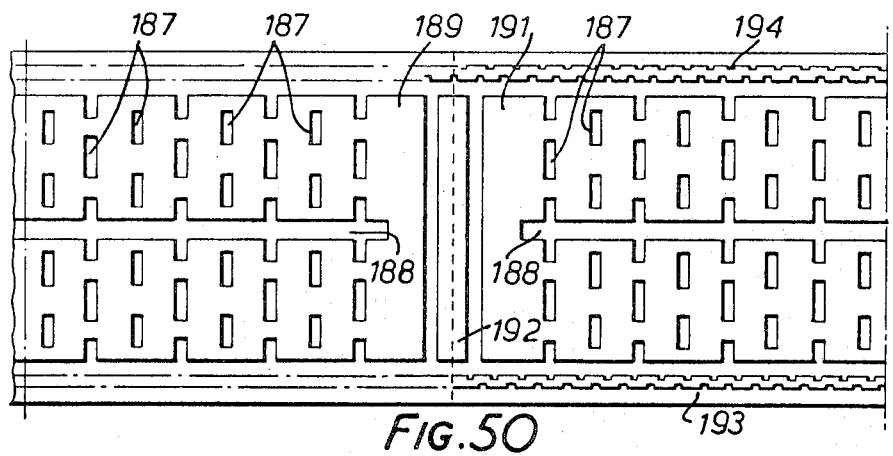
Figure 51:
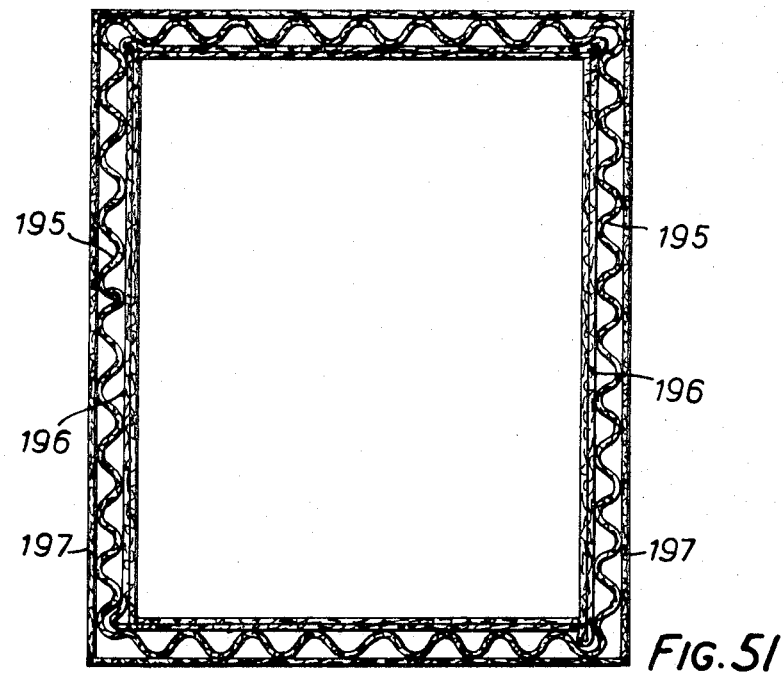
Figure 52:
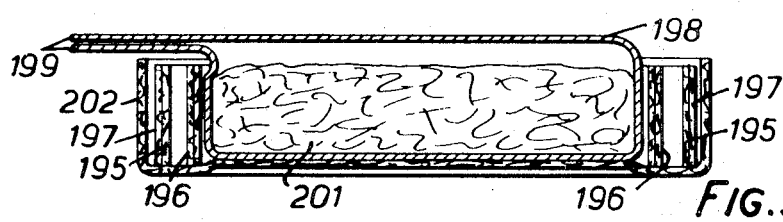
Figure 53:
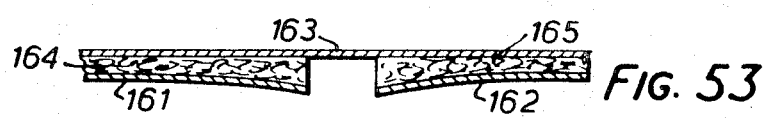
Figure 54:
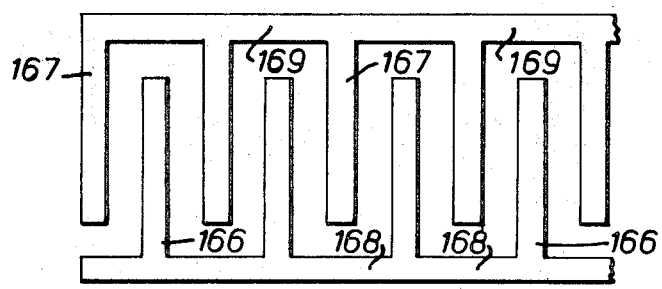
Figure 55:
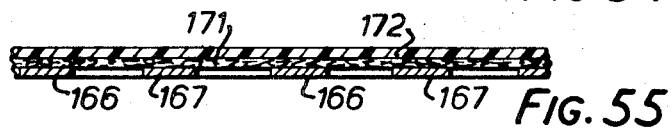

FIG. 34 a section of another form of heating film embodying a carbon film.

A convenient form of container used in a package according to the present invention is a trough like box made of moulded papier mache or similar material or folded from cardboard, paper or the like, the heating film being made integral with a folded-over unpatterned portion which forms an impervious cover layer which serves to enclose the substance in the container notwithstanding that the other material of the package may be porous, a thin electrically insulating layer coming between the folded-over portion and the pattern. The papier mache or folded cardboard, paper or the like is a relatively stiff fibrous material and it forms a thermally insulating layer, while the thin insulation and plain folded-over portion do not impose any great thermal resistance between the pattern and the packaged substance.

FIG. 1 is a perspective view and FIG. 2 a cross section of an open trough like box which may be moulded of such material as papier mache. The heating film itself is made from metallic foil of the general form shown in FIG. 3. It consists of a plain part 81 integral with a patterned part 82. In the figure a single meander path is formed by the pattern between the central zone and one margin of the complete piece of foil, but this in only one variety; generally the pattern comprises a number of repeats. The part 81 is of somewhat greater length than the part 82. A thin layer of insulating material for example paper of somewhat less width than the portion 82 but greater length is laid over it as indicated by the dotted line 83 and the portion 81 is then folded over the insulating on the line 84. This portion is of less width than the insulation 83, and thus after folding its edge is overlapped by the insulation. The margin of the portion 82 extends beyond the edge of the insulation 83. The foil and insulation may be held together by adhesive. The film so made is depressed into the trough like box and the edges are lapped over the edges of the box as indicated by the cross section FIG. 2, the dimensions of the film being designed so that the fold at 84 reaches just under the edge of the box, the edge of the portion 81 remains wholly on top while the projecting margin of the portion 82 is also lapped over the edge of the box. These two margins thus constitute the terminals of the pattern and connection can be made by means of a clip such as described in my U.S. Pat. No. 3,100,711.

The length of the patterned portion 82 may be such that it lies wholly within the box while the length of the portion 81 is such that it extends over the end walls of the box and over the upper edge. There will be some puckering of the portion 81 at the corners but this need not damage it and the foil will form an impervious lining which covers the slots in the pattern and is of good heat conductivity. The folding of this portion to fit the container may be facilitated by crimping the material and such crimping may also extend to the patterned portion 81 or the latter may be plain while only the portion 82 is crimped. After the box has been filled the open top may be closed by a cover held by adhesive and this may be arranged actually to press the packed substance against the heating film. Instead of a simple cover a second similar box can be used and the two be secured together by adhesive at the margins but the terminals of the films will need to be brought further out to permit connection to be made.

FIGs. 4 to 6 illustrate a somewhat similar container to FIGS. 1 to 3, but produced by shaping, scoring and folding of flat stiff fibrous thermally insulating material such as cardboard, incorporating the heating film. As before the film itself is made of a doubled piece of foil comprising a plain part 85, a patterned part 86, and a layer of insulation 87 between the two portions. After the film has been made, it is laid on (and may be laminated to) a sheet 88 of cardboard of similar material which has been slotted as at 89 and creased at the dotted lines 91. Thereafter the assembled material is folded at the crease lines and in the corners in the well known fashion to produce an open box as in FIG. 6.

The laminated packaging material can be produced in a web and is cut up in pieces for shipping as flat stock to be erected into a box when the box is filled. It can instead be supplied in the web, and the plain parts 85 which are to form the impervious inner layer of the box can be left uncrimped, if desired, although the patterned parts 86 may be crimped.

It will be seen in FIG. 5 that the margin of the patterned part 86 extends furthermost to the right, that the insulating sheet 87 does not extend quite as far while the edge of the plain part 85 of the foil does not reach quite to the edge of the paper sheet 87, but all these margins extend so far that when the folding is completed a projecting margin is formed with foil exposed on both sides. This foil constitutes the terminals and the projecting margin of the part 86 may be folded under so that both terminals are slightly overlapped by the paper 87. As before the patterned part 86 does not extend beyond the ends of the bottom of the box but the plain part 85 covers the bottom and all four walls of the box. The box may be closed by a plain cover or two boxes may be used together if provision is made for access to the terminals.

If it is necessary or desirable to provide for the substance in the box to be heated from the top as well as the bottom as shown in FIGS. 7 and 8 a folded box may be produced having an integral hinged lid 92, a heating film 93 extending into the lid. The film itself is made on the same lines as in FIGS. 4 to 6 the dimensions being modified and the terminals are brought out exactly as in FIG. 6. The shape, slotting and creasing of the cardboard or similar material and the manner of folding are in themselves well known and need not be described further. With this arrangement connection to the film can be effected without opening the box but if preferred the margin with the terminals can be folded inward so that the box must be partially opened to gain access to the terminals though they may then be folded outward. The package may be sealed with the terminals folded in and the lid sealed so that the purchaser has to destroy the seal to obtain access to the terminals.

Other schemes for supplementing the heat supplied by the heating film, including supplementary heating from the top are described later.

For packaging and heating a liquid, a box as shown in FIGS. 9 and 10 may be used. Such a box again is of well known form and can be produced by folding from a blank of suitable shape on very similar lines to FIGS. 4 to 8. A heating film 94 with accessible terminals 95 is incorporated and the patterned area extends up to the level 96 while the liquid level is at 97, so that it wholly covers the area of the film in which heat is developed.

By suitably changing the dimension and proportions of the blank various other folded box type containers can be produced and similarly moulded containers on the lines of FIGS. 1 to 3 can be produced with different proportions. A moulded container can be provided with a heated lid by extending the film into a moulded lid.

A particular difference between a moulded container and a folded container is that the latter necessarily has sharp corners at the folds while a moulded container can be produced with rounded corners which may be more desirable in some cases. Where the heating film extends into the lid the pattern may be dimensioned so that the heat developed per unit of area is different in the lid from what it is in the bottom of the container.

FIGS. 1 to 10 show the heating pattern consisting only of one meander path. This is done for sake of simplicity of drawing; each pattern can consist of a group of equal or different repeats, i.e., meander paths in parallel. These examples also assume a pattern of a single resistance or resistance grouping between two terminals and thus a single rate of heating and of heat distribution to the contents of the container under a specific supply voltage. A pattern with two branches having its terminals disposed to have connection made to it by a suitable clip (as described with reference to FIGS. 16, 17 and 18 of my U.S. Pat. No. 3,296,415) may be made as illustrated in FIGS. 11 and 12. A piece of foil (which again may be cut from a continuous length bearing a repeating pattern) has two patterned margins 98 each with a half length tab 99 at the extreme edge these tabs being relatively longitudinally staggered. The foil is scored and folded at its longitudinal centre line 101 and again at two longitudinal lines 102. Two pieces of sheet insulation, e.g., paper are introduced. One piece 103 goes between the two patterns. On one edge it reaches almost to the score lines 102 while on the other edge it reaches just beyond the edges of the tabs 99 so that the latter are effectively insulated from one another. The second sheet of insulation 104 is introduced between the upper surface of one pattern and the under surface of the doubled centre zone of the film. One edge of this insulation reaches the folds 102 while the other leaves the upper tab 99 exposed. The dimensions of the film and position of the score lines 101, 102 are such that the fold at 101 does not reach to the outer edge of the insulation 104 so that the latter effectively insulates the plain part of the foil over the upper pattern. The two tabs 99 constitute terminals while the zone of the plain part of the foil adjacent the fold 101 constitutes a common terminal. It will be clear that a heating film so made can be used for example in boxes such as those described with reference to FIGS. 1 to 10 and that the plain parts of the foil can be made longer to cover the end walls of the box. They can also be used in the heating of liquids at the time of dispensing from a storage vessel as described below.

An arrangement which enables specific quantities of liquid to be drawn out of a storage vessel and then heated before being dispensed comprise a tube having one end portion adapted to be inserted into the vessel, another end portion for discharge and between the end portions an enlargement of such volume as to contain at least one batch of the liquid. Suction is generated at the discharge end of the tube by sucking, by squeezing the flexible tube walls or otherwise and flow control means enable this to be used at choice to draw liquid from the vessel into the enlargement and to draw liquid from the enlargement through the discharge end. The dispensible heating film is in good contact with tube wall at least over the major part of the enlargement and the whole device constitutes a dispensible container. Flow control means may be combined with switching means for the heating film whereby the current can be varied according to whether liquid is being drawn into the enlargement or out of the enlargement, the film then having a pattern with at least two branches as described above.

FIG. 13 shows a device on the above lines. The tube 109 carried for example by a cork or similar stopper 111 and long enough to extend to the bottom of a storage vessel such as a bottle has a portion 112 of enlarged diameter above the stopper and of a volume to contain on batch to be dispensed. In good heat conductive contact with the wall of the enlargement 112 is a heating film 113 having two branches the terminals being brought out and connection being made by a clip 114. However there need only be two terminals and two contacts on the clip as the control of the flow through the two branches is not effected through the clip but by means of a draw-off tube 115. The draw-off tube is a sliding fit in the contracted upper end of the enlargement. To draw liquid into the enlargement the tube 115 is brought into its uppermost position shown in FIG. 15, when a fitting 122 ensures a sufficiently airtight closure of the enlargement. Suction on the outer end of the tube 115 will now draw liquid into the enlargement 112 and if the outer end is now closed by the finger the liquid will remain in the enlargement while the tube 115 is depressed until a conical fitting 116 at its lower end seats in the bottom of the enlargement and thus prevents liquid from running back into the bottle. There is a hold 117 in the tube 115 which is just above the fitting 116 so that if now suction is applied to the outer end the liquid will be drawn through the hole 117 into the tube 115 and out of its upper end, air entering between the tube 115 and the contracted end of the enlargement, a groove being provided if necessary for the passage of air.

There are two contacts 118 at the lower end of the enlargement which are bridged electrically by the fitting 116 in the lowered position of the tube 115. There are two separate pairs of contacts 119, 121 at the upper end of the enlargement which are separately bridged by the fitting 122 on the tube 115 when this is in the position shown in FIG. 13. The circuit is shown in FIG. 14. With the tube 115 in the position of FIG. 13 for drawing liquid into the enlargement there is no bridge across the contacts 118, consequently the supply passes from the lower of the terminals 123 first to the contacts 119 which are bridged by fitting 122 and thence to a terminal common to the two branches 124 of the heating film and then through the contacts 121 also bridged to the other terminal of the supply. Thus the two branches are in parallel and the maximum rate of heating is achieved. After the liquid has been heated as desired the tube 115 is depressed and in its lowermost position contacts 119 are disconnected, contacts 121 are disconnected, but contacts 118 are bridged. Accordingly the lower terminal of the supply is connected to the upper end of one of the branches 125 and the upper end of the other branch 124 is connected to the other terminal of the supply. The two branches are thus connected in series and the rate of heat development is therefore reduced to a quarter of what it was before serving to maintain the temperature of the liquid which will slowly rise or fall depending on the conditions of the particular case. Suction can be applied by any means but it is contemplated that this device is generally to be used for a beverage to be consumed by suction applied by the mouth after the fashion of a drinking straw.

The device illustrated in FIGS. 15 and 16 enables suction to be generated by the device itself more conveniently than in the device of FIG. 13.

In this case there is again a tube, marked 125 which reaches to the lower end of the storage vessel 126. It is shown passing through a closure in the top of a bottle but might carry a cork or the like as in FIG. 13. The tube 125 communicates with the upper end of an enlargement 127 which is made of cheap flexible material, e.g., polythene. The enlargement is equipped with a discharge tube 128 which reaches practically to the bottom, but also has an aperture 129 near its upper end, just under the flexible top 131 of the enlargement. Close by is an aperture 132 in the top 131 with a flap 133 which can close it but which tends to spring open.

Round the enlargement 127, in good heat conductive contact with it, is the dispensible heating film 134 provided with a two branch pattern. Connection is made to one branch by a clip 135, the pivot 136 of which is tubular and serves to hold the clip and enlargement together by passing the tube 125 through the pivot.

The second branch of the film pattern has a terminal area 137 covered at its end, near the clip attachment, by thin insulation 138 such as paper and over this is a piece 139 of spring foil with which the clip makes contact and which overlaps the paper 138 but normally springs away from the terminal area 137.

In use, by closing apertures 129 and 132 by finger pressure on the top 131 and flap 133, and applying suction to the end of the discharge tube 128 liquid can be drawn out of the vessel 126 and the enlargement 127. If the flap 133 is now released while the aperture 129 is held closed, continued suction will draw liquid out of the enlargement 127 and the tube 128. Alternatively the enlargement can be squeezed to drive out air, the apertures 129, 132 and the discharge end of the tube 128 be closed and the enlargement then released when its expansion will generate suction which will draw some liquid up into the enlargement and this pumping action can be repeated until the enlargement is full. Then further squeezing with both apertures closed will discharge liquid from the enlargement through the tube 128.

One terminal of the film will be in circuit as long as the supply is connected, while the other can be brought into action by pressing the foil 139 into contact with the terminal area 137. The fact that these foils are bare does not matter with a low supply voltage of, say, 12 volts. Both branches are brought into operation for rapid heating of the liquid when the enlargement is full, and one branch to maintain the temperature during the discharge of the enlargement. Alternatively the clip and terminal pattern of the film may be as described above with reference to FIGS. 11 and 12 to enable the heat dissipation to be varied.

The devices shown in FIGS. 13 and 16 can readily be produced by moulding such a material as polythene and will be cheap enough to be dispensible. Their shapes may vary considerably from those shown without any change in their operation. They may also be made of other materials and by other methods without any change in their operation, for example of folded paper or the like of a quality which remains impervious for the necessary period of use.

A dispensible container and dispensible heating film according to the invention can also be used in cases in which only part of the contents of a package are to be used at a time, in which case the film can be provided with means visible from the outside indicating the proportion of heated substance removed from the container. For example the film may be wrapped round the substance and have one end held under tension so that when some of the substance has been withdrawn, the film is drawn close to the reduced volume of the substance, a corresponding length of the film being drawn out of the container and serving as a measure of the removed substance.

Figure 18:
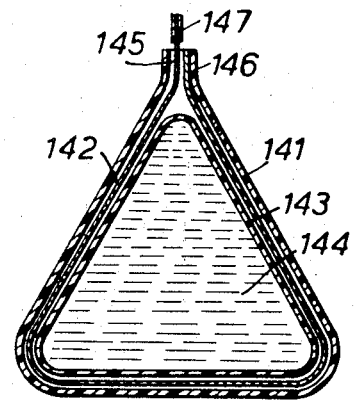

As shown in FIGS. 17 and 18 a dispensible container 141 of somewhat similar form to that shown in FIGS. 9 and 10 and which could similarly be made of folded paper or cardboard is equipped with a heating film 142 which surrounds a flexible bag 143 containing the substance 144 to be heated but is not stuck to the inside of the container. The container has a narrow aperture 145 of its full width and one edge 146 of the film is secured to the edge of the aperture, while the margin 147 at the other edge incorporates the terminals and passes through the aperture. When the container is full (FIG. 18) this only need emerge enough to permit access to the terminals by a clip 148 through which connection is made. Before use, this margin may be folded over and covered with a seal of paper or the like. The container also has provision for withdrawing heated substance through the end. For a granular substance it may for example simply be cut open for the purpose or have a scored area which can easily be removed, or if the substance is a liquid or becomes liquid when hot there may be a tube 149.

To heat the substance the whole is simply suspended from the clip as indicated in FIG. 17, when the weight holds the film in tension. When some of the heated substance is removed, a corresponding length of the film is drawn out and it is calibrated with markings indicated at 151 showing what proportion has been removed.

The above example has the film movable in relation to the container and its contents. So far as any part is no longer dissipating heat into the substance it is outside the container and accordingly as long as the film has no area dissipating more than 4 W/sq. inch no difficulty should arise even though this part dissipates heat at the same rate as when in contact with the substance. However other cases arise in which relative movement between the film and container is required, effected by means operable without removing the substance from the container for the purpose of changing the heat dissipating relationship of the film to at least part of the substance in the container. It may be necessary for example to change from conductive heating to radiative heating or to apply the heat to two different substances one of which changes its state and requires greater space for its accommodation.

An example of the latter is illustrated in FIG. 19. This illustrates the defreezing and then steaming of frozen raw food such as vegetables. The food 152 is enclosed in a bag 153 which incorporates the heating film and is held in a separate wrapper 154 at least the bottom of which is porour as at 155. The heating film is designed so that it develops most heat at the bottom of the bag. The lower part of the bag has at least one concertina fold as at 156 and contains the necessary water or other liquid. This liquid can be in the form of an ice cube inserted during packing or liquid can be added by the user when he opens the upper end of the bag to gain access to the terminals 157. In use the bag is suspended by the terminals 157 in a clip connector such as that described in my U.S. Pat. No. 3,100,711 with reference to FIGS. 4 and 5. The bag at first remains folded until defreezing is completed and the liquid is heated up, but when the pressure rises the fold 156 unfolds and room is left at the top for steam. If need be, there can be several folds depending on the proportions, the rate of boiling and such like conditions. Only a small steam escape is provided and there will be a constant reflux of condensed steam back into the body of liquid being boiled. Instead of a bag, a box may be used but this must be large enough to provide the necessary steam space.

A further development of the above scheme which permits a high input of heat to the food or other substances without the temperature rising above a value likely to cause difficulties through the development of stickiness and other undesirable phenomena due to surface decomposition is shown in FIGS. 20 to 24. This is particularly applicable to food or other substances which contain a low proportion of liquid but are permeable to vapor. If the food or other substance should be impenetrable to vapor, e.g., if it is deep frozen, it is made penetrable by holes or channels being provided for in the slab prior to, during, or after freezing and/or vapor paths being arranged along the sides of the slab by pulling the side walls of the package a little away from the frozen slab.

The characteristic of this development is that the substance is packed in such a way that there is a small body of liquid in the space between the heating film and the solid part of the substance at least as soon as melting has progressed sufficiently to affect the solid part.

Preferably the body of liquid is contained in a pervious spacer between the heating film and the substance. Accordingly, as long as any liquid is left, the temperature of the liquid cannot rise above its boiling point and the vapor thereby produced which is at this same temperature, permeates the substance and heats it, mainly by delivering its latent heat to the substance. This causes condensation and the liquid runs back into the bulk container in the spacer. In the typical case of water the temperature will not rise more than a little above 100° C. because pressure developed will not rise substantially above atmospheric. The rate of heat transferred can be relatively high because with water for example the latent heat amounts to nearly five times the sensible heat at boiling point.

The separator can be of any convenient construction and any convenient material which will withstand the temperature and not give rise to undesirable chemical reactions. Typically it can be of metal, e.g., aluminum or of so-called plastics material, e.g., "Nylon." In the case of food the liquid and the spacer are desirably edible. Thus the spacer may be a thin slab of ice or edible jelly, or it may be a porous biscuit or wafer or a reticulated structure of jelly, with the spacer filled with water, preferably frozen when assembled.

FIGS. 20 to 24 illustrate two examples. The package itself is similar to that illustrated in the earlier example (FIGS. 1 and 2) and comprises a shallow tray or bos 301 of papier mache, or other suitable material, and a heating film 303 lining the bottom of the container. It could equally well be made in accordance with other earlier examples such as those of FIGS. 5 to 10.

The foil pattern 303 is backed by an insulator 302 of paper or the like. If the frozen food pack is heated in a tray or pan the papier mache container is not necessary and the insulator forms the bottom of the frozen food pack. It serves also to insulate the foil pattern 303 from the tray if the latter is a metal tray.

There is also an insulator 305 of paper or the like on the upper surface of the film, but at the two ends of the film extends beyond the paper at 304 constituting busbars or terminals. The upper insulator 305 is covered with an aluminum foil 306 to protect it from the liquid. There is an inner lining 308, the bottom of which is perforated and spaced from the foil 306. This liner 308 receives the substance to be heated. Its edges are folded over the insulator 305 (FIGS. 21 and 23) at the ends and closely over the margin of the tray 301 elsewhere (FIG. 22). There is a cover 310 of aluminum foil which is similarly positioned or secured round the edges.

The space between the perforated bottom of the liner 308 and the foil 306 serves to receive a pervious or porous spacer which holds them apart and which holds the liquid. In the first example (FIGS. 20 and 21) this spacer 307 consists of a loosely woven, knitted or simply tangled stranded material which may be for instance of cord, wire or nylon.

In the second example (FIGS. 23 and 24) the spacer is integral with the bottom of the liner 308 which is folded into ribs 309 located between the apertures. It is emphasised that these are only examples of possible materials and constructions of absorbent spacer, and in particular in the case of food the spacer may be of edible material.

Instead of the combined perforated foil 308 and ribs 309 the insulator 305 could be crimped or otherwise folded into ribs (these ribs could be perforated) and form a spacer for either the perforated foil 308 or for the solid food directly, if the solid food parts are large enough to rest on the ribs. In this case a perforated foil 308 is not necessary for preventing direct contact with the heating film.

A similar effect can be obtained by other forms of combined insulating spacer and barrier, such as very porous plastic sheets, nets or sieves used as the insulator without provision of a perforated foil.

While the provision of a foil or film type spacer barrier is preferred for the purpose of ensuring that there is a body of liquid in the space between the solid food and the heating film, other means to ensure this result are also possible and are within the scope of this invention. The frozen food slab may for instance, have a slanted bottom like an inverted pyramid or roof the crest resting on the flat tray. The heating film being heavily crimped collects the liquid in the crimps, melts channels for the vapor path and is so lightly fixed to the food that after the ice to which it adhered has melted, it drops away from the bottom of the food to allow more space for the liquid or vapor. In this variety neither a special spacer nor a barrier is required, spacing being effected by the shaping of the frozen food slab.

In another variety of the present invention the perforated foil is used as a wrapping for the frozen food which is supplied packed in this wrapping while the heating film with all or only some of its parts 302, 303, 304, 305 is supplied separately so as to permit a choice for heating the food either by the heating film or in a metal pan on a standard gas or electric cooker.

The rapid heating of the frozen food can be still further accelerated by the tray 301 being vibrated and/or by the heating film being supplied with pulsed current. This "shock-heating" by a cyclic succession of heavy current and no or low current periods gives the food a better opportunity to take up the heat of condensation.

For some purposes it may be desirable for the heating film or part of it to occupy a compact configuration before the ultimate removal of the heated substance from the dispensible container, means being provided which are operable without removing the substance from the container for stretching the film or the aforesaid part of it into an extended form and location for transferring heat from it to the substance. To permit heating while the film is in its compact configuration its terminals are made accessible without removing the substance from the container.

An example is food in slices. In FIG. 25 the film is a long web 158 folded concertina-wise, the folds holding thin slices 159 of the foodstuff. The whole may be enclosed in a usual wrapping or container not shown. This arrangement permits very quick heating up in view of the large surface area in contact with the food and the thinness of the food sandwiched between the folds of the heating film. As shown only the odd folds of the web are filled with food slices, the even folds being compressed together; thus the web assumes a comb-like configuration. The comb ends may as shown be bent to enclose the slices completely. The heating film may be porous or perforated to permit circulation of liquid or vapor between adjacent slices or the slices may have inner wrappings for easier and cleaner removal. More than one web may be arranged in a food package or container. This application of the heating film is one preferred way for quick de-freezing of deep-frozen food, for rendering wafers and biscuits crisp again and for many solid foods which are enclosed in a package of insufficient surface areas to permit a speedy enough penetration of heat from that area to the inside.

When the film is supplied with current in its folded compact configuration each slice is heated from both sides and this combined with the small external surface ensures rapid heating. When the slices are to be removed, the whole is unfolded into the form shown in FIG. 26. Assuming all the slices 159 remain associated with the corresponding folds of the film 158, when unfolded there will be a single width of film alternating with each slice. Thus if the current supply is maintained a smaller proportion of the total heat will be conducted into the slices so that they will be heated to a lesser extent. The pattern of the film can be designed to proportion the heat which reaches the slices and that which is simply radiated away as desired, in particular it may be more than 4 watts per square inch in those parts on which the slices rest and less in the other parts.

The heating film can have terminals not shown at the folds or some of them to permit the heating of a single slice or of a group of slices whether in the folded or unfolded configuration.

As above mentioned it may be desirable in some cases to provide for the heat supplied by the heating film to be supplemented by heat from another source. FIGS. 27 and 28 illustrate some possibilities.

One purpose served by these developments is not only to effect heating quickly and efficiently without the risk of local overheating, but to permit the package itself to determine or directy to control the magnitude and time function of the heating parameters, i.e., temperature, type, direction, and source of heat energy fed into packaged material; humidity or steam developed and kept in enclosure or released, or material processed dry; pressure in enclosure.

The main feature of this development is a thick plate 351 of material of good thermal conductivity, usually but not necessarily of metal such as aluminum or copper, which fits easily with plenty of play into a vessel 352 holding the food 353 or other substance to be heated. The food or other substance may be deep frozen. The vessel 352 may itself be a box or the like as described above with reference to FIGS. 1 to 6 and equipped with a heating film, or it could be as described with reference to FIGS. 20 to 24; any cover would be removed before the plate 351 is put into it. When in place the plate 351 rests on the food 353 either directly or with an interposed layer or layers to be described. An electric heater 354 is electrically insulated by insulation indicated 355 from, but in good thermally conductive contact with, the plate 351. A foil heating film, referred to above, or described in any of U.S. Pat. Nos. 3,283,284 or 3,033,970, or 3,020,378 or 3,149,406 is a preferred heating element for this application particularly if it is run at a low voltage, not dangerous to touch, i.e., below approximately 50 volts.

A temperature sensing element 356, such as a thermostat of the capillary tube type, is embedded in a hole drilled in the plate 351 and leads to a switch, contactor or other control device 357 which regulates the energy supplied to the heater 354 so that the plate 351 is held at a desired temperature within the narrow limits of this control arrangement. The heater is rated to have sufficient power quickly to replace into the thermal capacity of the plate 351 any heat which it has lost when in contact with the substance to be heated even when this heat loss is the maximum loss foreseen during practical use of the device. The temperature at which the plate 351 is held is adjustable by adjusting the control device 357 at which the thermostat 356 operates. The adjustment dial 358 is preferably on or near a fused plug 359 from which the supply to the heater 354 is drawn or at some other convenient location.

A thermally insulating cover 362 constitutes an efficient lagging over the heater 354 on top of plate 351 so that almost all heat energy from the heater 354 flows downwards into the plate 351 and neither the heater nor the plate can dissipate heat upwardly to any great extent.

The parts 351, 354, 355, 356 and 362 form a lid which can be closed on to the vessel 352. In addition to the above essential components the lid may also contain the following optional features:

There may be provision to limit the depth to which plate can sink into the food when the lid is placed on it. This provision may be adjustable bolts, handles, knobs, protrusions or the like and limit the lowest position of the plate relative to the edge of the food vessel or to its bottom or to another convenient point. By way of example the lid is shown provided with lugs 360 through which pass bolts 363 provided with lock nuts 364. Descent of the lid is checked by engagement of the bolts 363 with lugs 365 on the vessel 352. There may be clips 366 or other convenient provision for the attachment of an aluminum foil or plastic film 367 (e.g., a high density polythene film or polypropylene film) with which to cover at least the bottom and sides of plate 351 temporarily so that it never directly touches the food. After use the aluminum foil or plastic film 367 is dispensed with. If the bottom of the plate 351 is not plane, cylindrical or undulated but dimpled or of any other shape not developed from a plane, the aluminum foil or plastic film 367 is premoulded into the same shape in order to fit snugly over the bottom of the plate.

There may be provision to strip any food adhering to the aluminum foil or to the plastic film 367 after heating when the lid is lifted. This provision can be a blade or an edge 368 which can be moved over the foil or past which the foil is pulled out, and the foil or film then may be thrown away, soiled but without more than at most a thin layer of food on it.

Instead of securing a foil or film 367 to the plate 351 a piece of aluminum foil or a plastic film 369 FIG. 28 can be placed on the food 353a directly and the lid be placed with the plate 351 in direct contact with the foil or film, which after the heating cycle is taken off the food at any convenient time after the lid has been lifted.

Provision is always made, e.g., handles 371, for handling the lid and there may be a pilot light 372 or other signalling provision preferably on or near the control device 357 which is operated by the thermostat 356.

A preferred design makes the lagging constituted by the cover 361 of such low density that the overall density of the whole lid including plate 351 is lower than that of boiling water so that the lid can only sink into any liquid food to less than its full height. In any case this would only occur if the bolts 363 or equivalent were wrongly adjusted.

The functioning of the lid which is hot when placed on the food 353 with the aluminum foil or film 368 or 369 intervening is that of supplying to the food first of all the heat stored in the plate 351 which is at the maximum temperature to which the foil may be raised without detriment, and to supply to it further all the rest which can flow into it through the difference of temperature between the plate 351, the temperature of which is kept more or less constant by the thermostat 356, and that of the food 353. Thus as large an amount of heat can flow into the food at the maximum safe temperature as the food itself can conduct away from the plate 351. The plate surface is therefore made as large as practically feasible (by curving, undulations, dimples, etc.) and compatible with intimacy of contact with the intervening aluminum foil or plastic film 367 or 369 and the possibility of stripping it off easily after the heating cycle. The safe temperature of the plate when acting on food containing liquid is always above 100° C. The level of the bottom surface of the plate may be inclined or arcuate in order to avoid trapping vapors which apart from causing other difficulties obstruct good conduction of heat. The good heat conductivity of the material of plate 351 and its relatively large mass ensures an even temperature of the plate over its whole surface even if heat conduction into the food is temporarily locally obstructed. There is no hot spot danger.

The lid always remains clean because the aluminum foil or film 368 or 369 prevents it from coming in direct contact with the food. It should be left switched on during brief intervals in its active use. Its power consumption when the plate 351 is in free air, is only very small as the thermostat 356 holds it at the set temperature.

A preferred method of producing the plate 351 is to die-cast it in aluminum and to anodize it.

It is possible in some cases to make a container in which a substance is to be heated of the heating film itself and the film may be no more than a laminate of patterned foil, e.g., aluminum foil and a paper or a plastic film. The choice of plastic film depends — apart from the usual packing considerations (compatibility with contents, vapor-permeability, price, strength, facility for decoration, etc.), on the temperature endurance of the particular plastic. When the intended heating temperature is low enough it permits the use of ordinary polythene film, polyvinylchloride, regenerated cellulose (Cellophane) and even paper. Where higher temperature plastic films are needed, irradiated or high density polyethylene-, polypropylene, polycarbonate-, or polyester film is chosen while others may become available in the course of time.

If, for instance, a bag is made from this two-layer material, the aluminum foil is first patterned by any known convenient process, such as that described in my U.S. Pat. No. 3,283,284 or by punching slots. The pattern provides one (or more) continuous aluminum line(s) with very small gaps between them and covers nearly the whole area of the bag except for certain strips which are not connected with the continuous heater line(s). As shown by way of example in FIG. 29 the continuous lines are produced by rows of apertures 187 and long slots 188. Consideration will show that this results in a number of meandering paths in parallel being produced between a terminal area 189 and a terminal area 191 of each portion of the patterned area. Between each such patterned area and not connected with the continuous heater lines are transverse strips 192 which form edge reinforcements on the fold when the material is folded into a bag. It will be understood that a repeating pattern is produced on a continuous length of insulating support 193 which is severed at the dot lines and folded at the dot and dash lines. Another strip 194 also not connected with the continuous lines is arranged along each edge. This is a narrow line with many holes or notches to increase its resistance. When the material is folded into a bag, the longitudinal edges are folded over and these fine line patterns 194 are connected to a suitable voltage supply to provide the necessary sealing heat. The overlaid plastic film edges weld together in the areas of the gaps between, within, and around the metal lines 194. The hot metal lines themselves also become adherent to the plastic. This procedure is, of course, only possible where the heat-sealing temperature lies well above the designed maximum operating temperature of the bag and where the seal is not affected by operating temperature.

With the particular arrangement shown, when the bag is completed there are two separate patterns, one on each side, each having two terminal areas. A device similar to that shown in FIG. 4 of my U.S. Pat. No. 3,296,415 may be used but with each of the two rubber packings 23 carrying two contacts extending over a little less than half length. The foil contacts opposite one another on the two rubber backings will be of the same polarity so that when the device is closed without a bag in position, there is no short-circuiting.

The pattern of the continuous heater line or lines is usually a meander with very small gaps, wide and short areas covering nearly the whole area available as shown in FIG. 29.

The pattern of the heating film may incorporate a safety device by which the circuit is broken when the desired temperature or a temperature reckoned dangerous is reached. There may be a fuse for instance in the foil pattern of the heating film itself. Such provision is made by narrowing the width of the continuous line at a convenient place in the film so that this part of the pattern constitutes a fuse which will blow at a certain current. Another way to provide a fuse is to connect a tiny link in the pattern which consists of two pieces of foil under tension held together with a solder or other fusible adhesive. The tension may be that which is present in any event in such an article as a filled bag of flexible heating film or by development of vapour pressure during heating of the foodstuff. If the solder or fusible adhesive has a low melting point it will also break on being overheated by any means.

The containers above described in general have adequate stiffness and strength to withstand the necessary handling while permitting easy access to the contents. A further development which has side walls of particularly good stiffness and heat insulating qualities employs a laminated structural material of high stiffness but low weight. This material is generally sandwiched between two flat films or foils of which the inner film may be or may support the thin plastic heating film with the metallic pattern and the outer a decorated paper, plastic film or metallic foil. Between and to these thin, smooth skins a thick, airy, buckling-resisting layer is stuck consisting for instance of corrugated paper or cardboard, stiff plastic foam, honeycomb construction, papier mache or a similar, cheap and lightweight stiffening filler. There is no need to make the whole package from this laminated material. It is, for instance, sufficient to have it on the four low side walls of shallow box - or tray - like food packs, thus constituting a stiff frame of the stressed skin type, while the large bottom area or top and bottom areas are formed only by the heating film proper. Thus as shown for example in FIGS. 30 and 31, the sides of the container are made of corrugated paper 195 having the usual base paper 196 and another paper 197 stretched over and secured to the crests of the corrugations so that a composite material of the stressed skin type results which is stiff in planes normal to the corrugations as well as along the corrugations which are here set perpendicular to the top and bottom of the container. The heating film 198 forms the top and bottom, with tabs 199 carrying the terminal areas projecting sideways and this assembly containing the food 201 is contained in a usual cardboard box 202 recessed at the bottom to protect the film and contents. Such packs can be safely stacked on one another and can be connected in circuit when so stacked.

The films above described have all had the resistive path formed by a meander patterned foil. The invention provides other forms of resistive path which can be made sufficiently thin and flexible and sufficiently cheaply to be dispensible. In these the surface pattern includes at least two large surface areas of thin metallic layers forming the terminals and also forming adjacent electrodes, and a carbon film which extends over said electrodes and forms the electrical path between them.

One form which such a resistive path can take is shown in section in FIG. 32. This comprises three sheets of metallic foil, e.g., tinfoil or aluminum foil. Two sheets 161, 162 (in this example of the same width) are spaced apart while the third sheet 163 is wide enough to extend over the other two sheets. All three sheets constitute electrodes of large area while parts of the sheets 161, 162 also constitute terminal areas. A film 164 incorporating carbon, e.g., graphite, particles as the conductive ingredient is interposed between the sheets 161, 163 and another carbon film 165 brtween the sheets 163, 162, the current flow being through the thickness of these films but along the foil sheets as seen in FIG. 32. To control the current distribution and thus the heat development, the thickness of the films 164, 164 may vary along them. Uniform distribution, which will usually be wanted, requires the thickness to increase towards the adjacent edges of the sheets 161, 162 as is indicated in the drawing.

The carbon, e.g., graphite particles are held in place in the film by a so called plastics material or some other binder such as is used in the resistors used in electronic apparatus. Choice of the nature and proportion of the binder enables the resistivity of the film to be given the value required for the particular supply voltage or loading in view.

The structure shown in FIG. 32 will need insulating (not shown) on one or both faces, which may be of paper, lacquer, or other thin flexible material, appropriate terminal areas being left bare for making connection, suitably by a clip as above described. In the case of a metallic canister, the third sheet 163 may be constituted by the wall of the canister itself.

Another form in which the resistive path is a carbon, e.g. graphite, film between electrodes is illustrated in FIGS. 33 and 34. Here there are two-comb-like members of metallic foil having their respective limbs 166, 167, intermeshed while their continuous parts 168, 169 constitute terminals. Space is left between the limbs and continuous parts which is bridged by the carbon film 171, and the current flows through it in the plane of the carbon film. The resistivity of the metallic foil may be substantially negligible compared with that of the carbon film so that each electrode and terminal member is at substantially the same potential at all parts and the voltage drop and therefore the heat development will be substantially limited to the carbon film. Choice of the spacing between the electrode limbs enables the heat distribution to be controlled.

This structure needs a layer of insulation 172 on the back of the carbon film 171. This can be a separate sheet, for example of paper, or if the part of the container to which the film is applied is of insulating material it may be constituted by the container wall. There may also be a sheet of insulation over the metallic foils, leaving adequate terminal areas bare or accessible.

It will be clear that both forms of resistive paths illustrated in FIGS. 32, 33 and 34 can be produced in long lengths and pieces of the required length be cut off to make individual heating films before or after the application of insulation.

The term "removable plastic substance" is used herein for the sake of convenience to embrace any substance which will be sufficiently plastically deformable or mobile to be removed from the container of the invention at a temperature to which it can safely be heated therein. Thus in addition to materials which would commonly be regarded as plastic, there may be held in the dispensible container materials which will be rigidly solid at normal temperatures or during storage at low temperature and solid materials, in fluent form, such as powders and granulated substances.

I claim:

1. A package comprising in combination, a dispensable closed container constructed for a single use to hold a removable substance, a substance held in said container to be heated whilst supported within the container and to be removed when sufficiently heated, a thin low-voltage heating film comprising metallic foil on a thin electrically-insulating support disposed to prevent conductive contact of the film with the removable substance, the foil being shaped to form a meandering pattern of narrow conductors but having margins on two opposite edge portions of the pattern, the margins being wide compared with the narrow conductors of the pattern, the pattern being disposed inside the said container the said opposite margins providing terminals for the pattern and extending outside the container for connection to a current supply without removing said substance from said container, and the package being openable to permit access to the substance in the container after it is heated.

2. A package as defined in claim 1 including means whereby the container is openable for the removal of a part of the contained substance without impairing its ability to contain the remainder of the substance.

3. A package as defined in claim 1 wherein the package includes a compartment for containing a second substance and means are provided for dispensing batches of liquid from a storage vessel into said second compartment.

4. A package as defined in claim 1, wherein the film is made of a doubled piece of foil comprising a plain part and a patterned part with a layer of insulation between the two parts.

5. A package as defined in claim 1, wherein the container is of cardboard slotted and creased to be folded into a receptacle shape.

6. A package as defined in claim 1 having an integral closure with the heating film extending into the closure.

7. A package as defined in claim 6 wherein the terminals are folded inside and the lid sealed so that the seal must be broken to obtain access to the terminals.

8. A package as defined in claim 1 including means for varying the shape of the container when said substance is therein.

9. A package as defined in claim 1 providing a substantially closed receptacle for retaining liquid.

* * * * *